US012162048B2

(12) United States Patent
Itoh

(10) Patent No.: US 12,162,048 B2
(45) Date of Patent: Dec. 10, 2024

(54) LABEL PEELING DEVICE AND LABEL PEELING METHOD

(71) Applicant: Aoi Seiki Co., Ltd., Kumamoto (JP)

(72) Inventor: Teruaki Itoh, Kumamoto (JP)

(73) Assignee: Aoi Seiki Co., Ltd., Kumamoto (JP)

( * ) Notice: Subject to any disclaimer, the term of this patent is extended or adjusted under 35 U.S.C. 154(b) by 444 days.

(21) Appl. No.: 17/525,141

(22) Filed: Nov. 12, 2021

(65) Prior Publication Data

US 2022/0168788 A1 Jun. 2, 2022

(30) Foreign Application Priority Data

Nov. 30, 2020 (JP) ................................ 2020-198644

(51) Int. Cl.

*B08B 9/08* (2006.01)
*B08B 1/16* (2024.01)
*B08B 5/04* (2006.01)

(52) U.S. Cl.

CPC .............. *B08B 9/083* (2013.01); *B08B 1/165* (2024.01); *B08B 5/04* (2013.01); *B08B* *2220/01* (2013.01)

(58) Field of Classification Search

CPC ........... B08B 9/083; B08B 1/165; B08B 5/04; B08B 2220/01; B08B 9/426; B08B 9/38; B08B 13/00; G01N 1/286; H04N 23/00

See application file for complete search history.

(56) References Cited

U.S. PATENT DOCUMENTS

| | | | |
|---|---|---|---|
| 5,152,865 | A | 10/1992 | Hurst |
| 5,372,672 | A | 12/1994 | Seifert et al. |
| 5,885,401 | A | 3/1999 | Eiban |
| 7,858,033 | B2 | 12/2010 | Itoh |
| 8,479,797 | B1 | 7/2013 | Hurst |
| 8,479,979 | B2 | 7/2013 | Hurst |
| 2008/0069730 | A1 | 3/2008 | Itoh |
| 2009/0007737 | A1 | 1/2009 | Pierce |

FOREIGN PATENT DOCUMENTS

| | | | |
|---|---|---|---|
| CN | 107999470 | A | 5/2018 |
| CN | 109192057 | A | 1/2019 |
| CN | 209999269 | U | 1/2020 |
| CN | 111392146 | A | 7/2020 |
| JP | 09-501103 | | 2/1997 |
| JP | 2005-017219 | | 1/2005 |
| JP | 2008-076185 | | 4/2008 |

OTHER PUBLICATIONS

Extended European Search Report in European Patent Application No. 21209630.9 dated Apr. 8, 2022, in 10 pages.

(Continued)

*Primary Examiner* — George R Koch
*Assistant Examiner* — Christopher C Caillouet
(74) *Attorney, Agent, or Firm* — Knobbe Martens Olson & Bear, LLP

(57) ABSTRACT

According to an embodiment, a label peeling device includes a container holding portion configured to hold a specimen container, and a cutter holder configured to detachably hold a cutter, to apply a blade of the cutter to a side surface of the specimen container held by the container holding portion with a label being attached to the side surface, and to move along an axial direction of the specimen container, thereby peeling the label attached to the side surface of the specimen container.

7 Claims, 8 Drawing Sheets

(56) References Cited

OTHER PUBLICATIONS

Office Action received in Chinese Application 202111429977.1, dated Apr. 3, 2023.
Notification of Examination Opinion received in Taiwanese Patent Application No. 110142562, dated Jul. 12, 2022.
Office Action received in Chinese Application 202111429977.1, dated Apr. 12, 2023.
Notification of Examination Opinion received in Chinese Patent Application No. 110142562, dated Jul. 12, 2022.
First Office Action received in Japanese Application No. 2020-198644, dated Jun. 4, 2024.

LABEL PEELING DEVICE AND LABEL PEELING METHOD

CROSS-REFERENCE TO RELATED APPLICATION

This application is based upon and claims the benefit of priority from the prior Japanese Patent Application No. 2020-198644, filed Nov. 30, 2020, the entire content of which is incorporated herein by reference.

FIELD

The present invention relates generally to a label peeling device, and a label peeling method.

BACKGROUND

As preprocessing of processing for various kinds of blood tests such as biochemical analyses, for example, an image of a specimen container is acquired and a pre-test condition of the specimen is detected based on the image. For example, the specimen container is made of a transparent material, such as glass. In general, a label indicating information on the specimen, such as identification information, is attached to an outer circumferential surface of the specimen container. Therefore, the label may be removed before an image of the specimen container is captured (Jpn. Pat. Appln. KOKAI Publication No. 2008-76185).

As a method for peeling a label, a cutter, such as an ultrasonic cutter, is applied to a side of the specimen container to incise the label. The label peeling process requires that only the label be peeled without cause of damage to the specimen container. However, problems may occur leading to complications with position adjustment and operation.

Therefore, an object of the present invention is to provide a label peeling device and a specimen processing apparatus that can prevent specimen containers from being damaged.

DETAILED DESCRIPTION

First Embodiment

Figure 1:
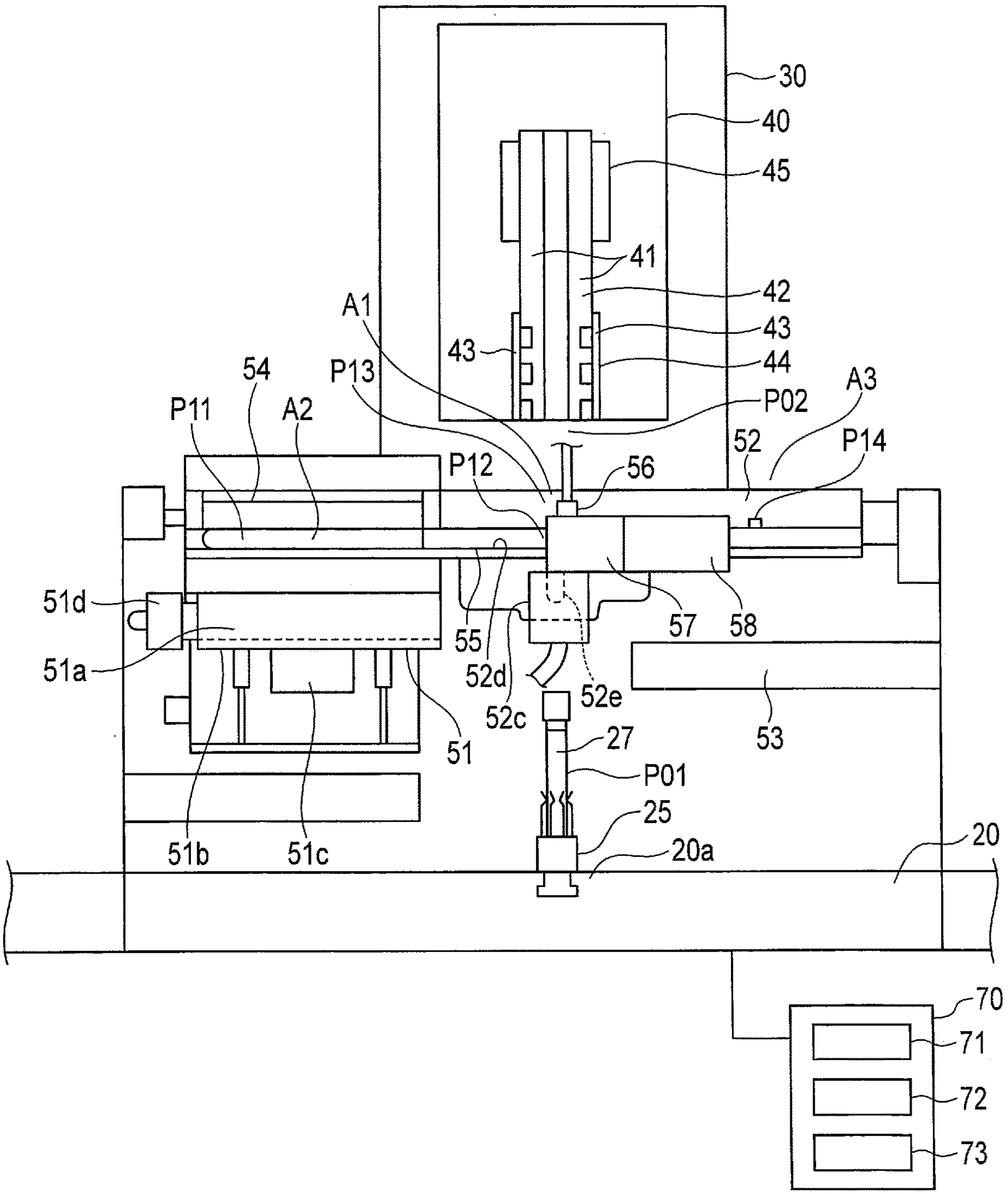
FIG. 1 is a front view of a label peeling device according to a first embodiment.
Figure 2:
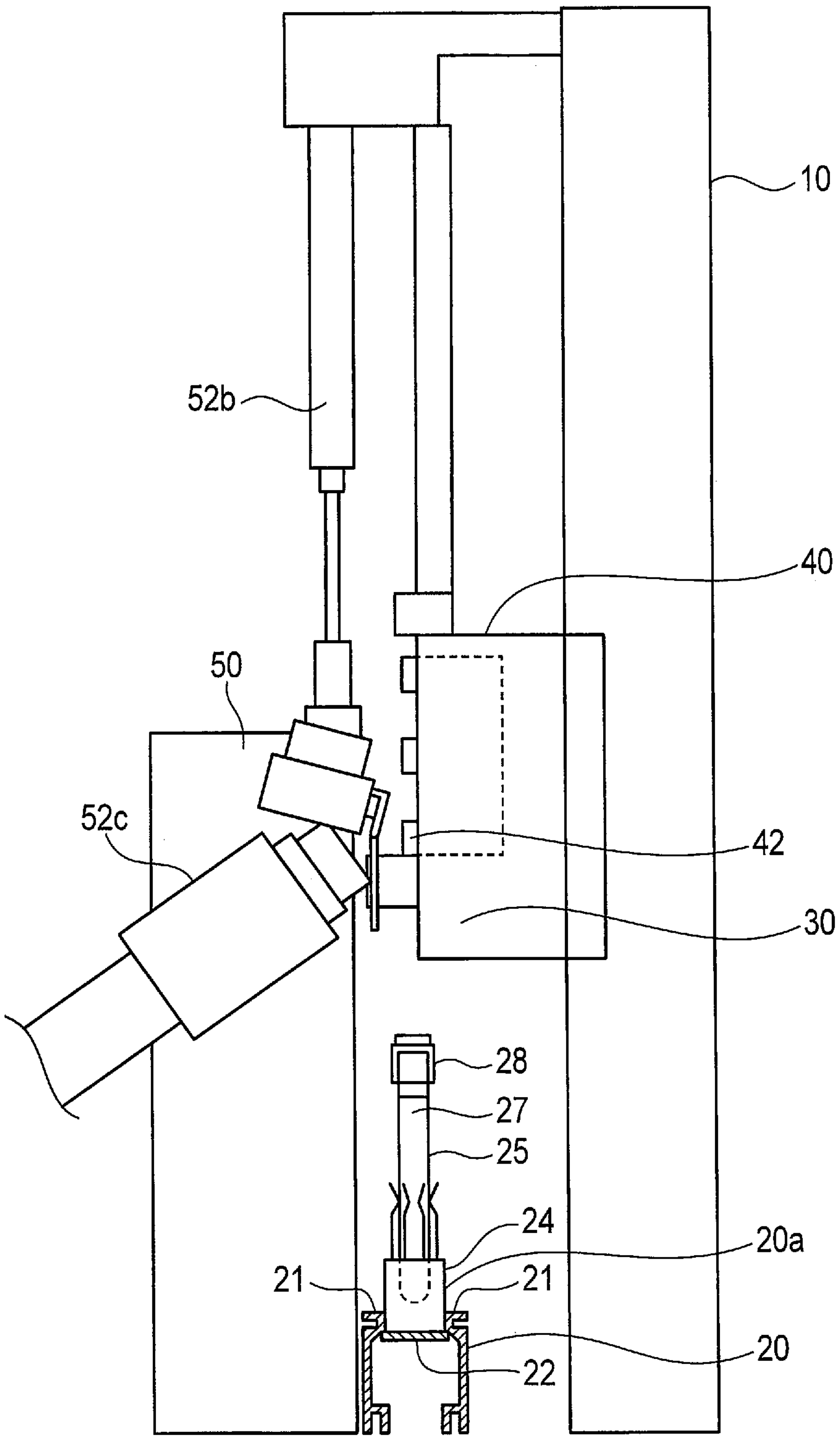
FIG. 2 is a side view of the label peeling device according to the embodiment.
Figure 3:
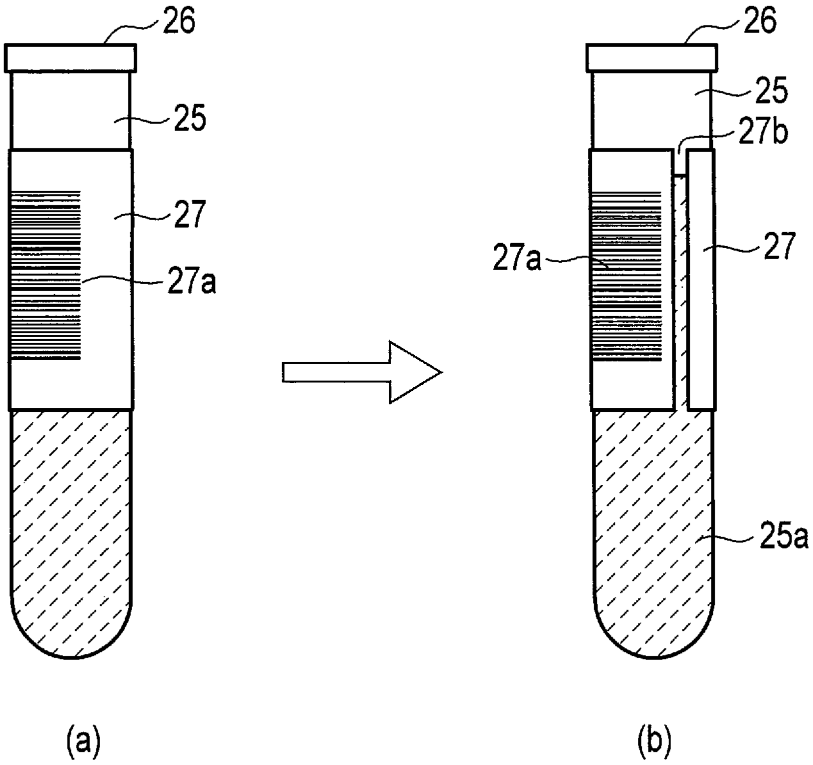
FIG. 3 is an explanatory view showing an appearance of a specimen container, which is a test target of a specimen processing apparatus.
Figure 4:
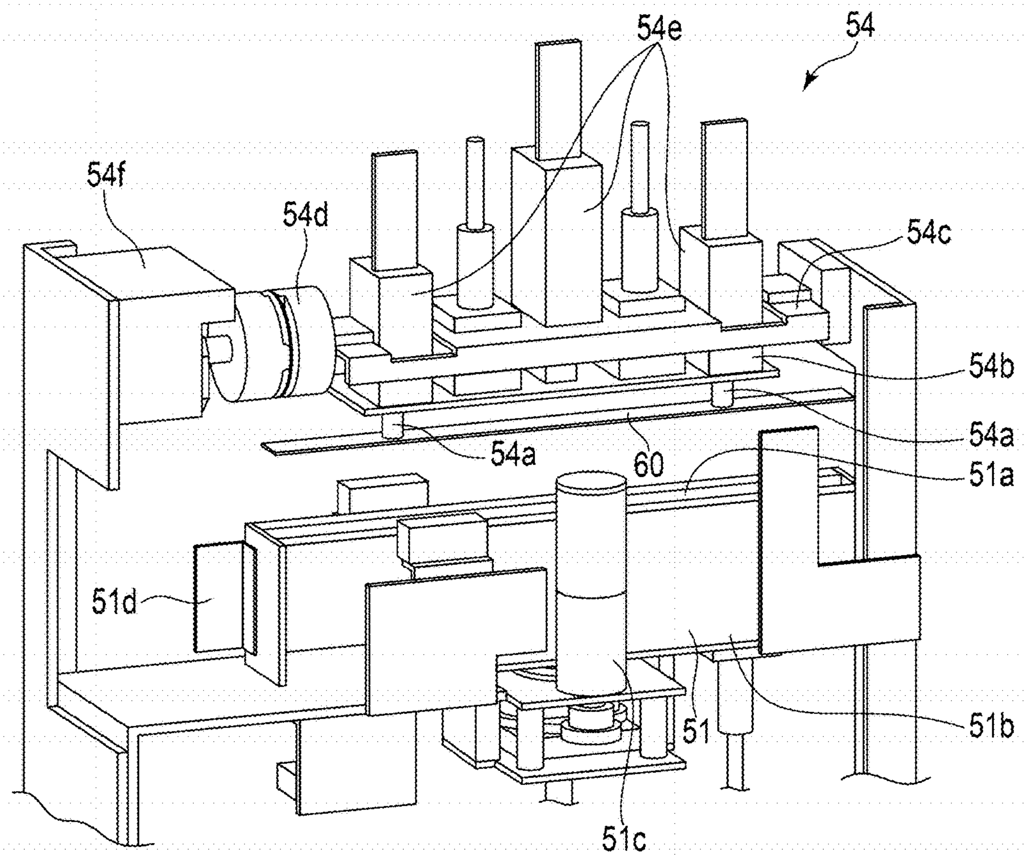
FIG. 4 is a perspective view showing a configuration of a cutter supply portion of the label peeling device according to the embodiment.
Figure 5:
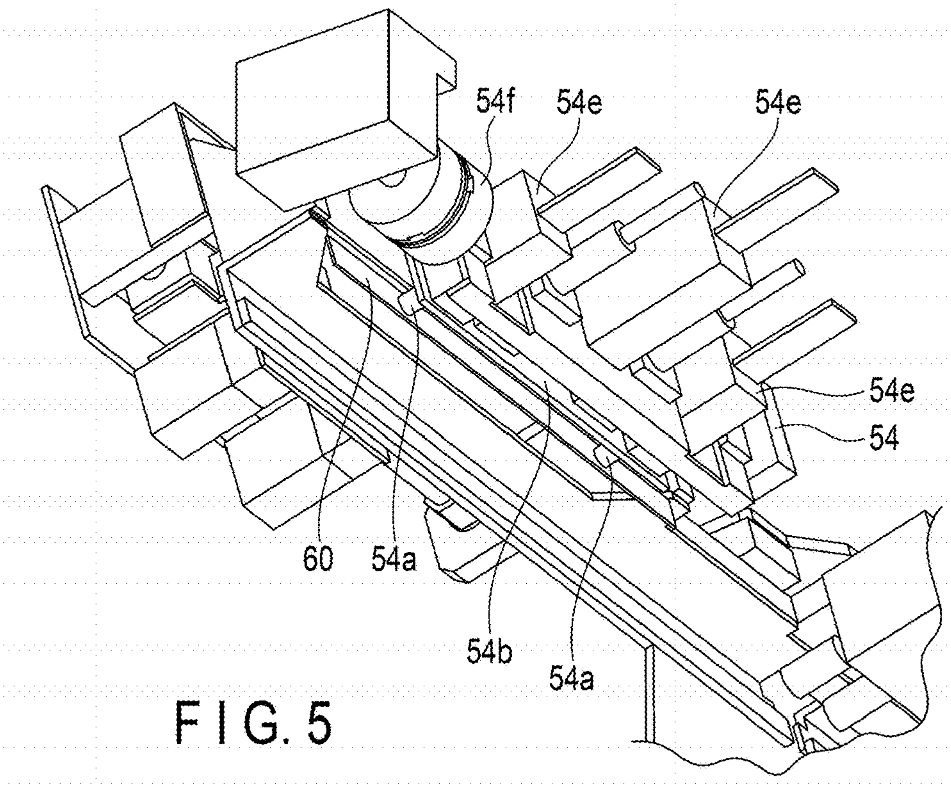
FIG. 5 is a perspective view showing a configuration of the cutter supply portion of the label peeling device.
Figure 6:
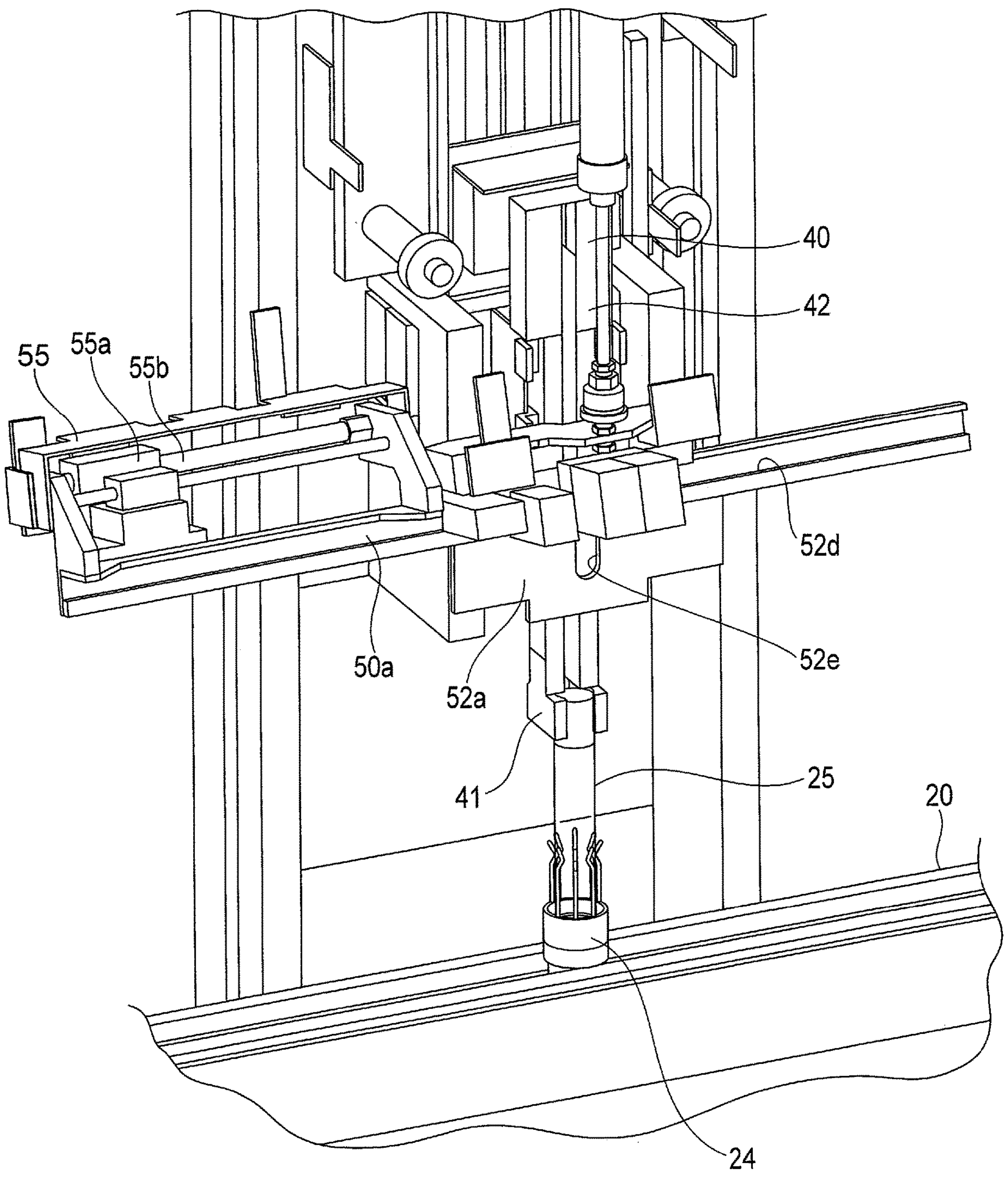
FIG. 6 is a perspective view showing a configuration of a peeling portion of the label peeling device.
Figure 7:
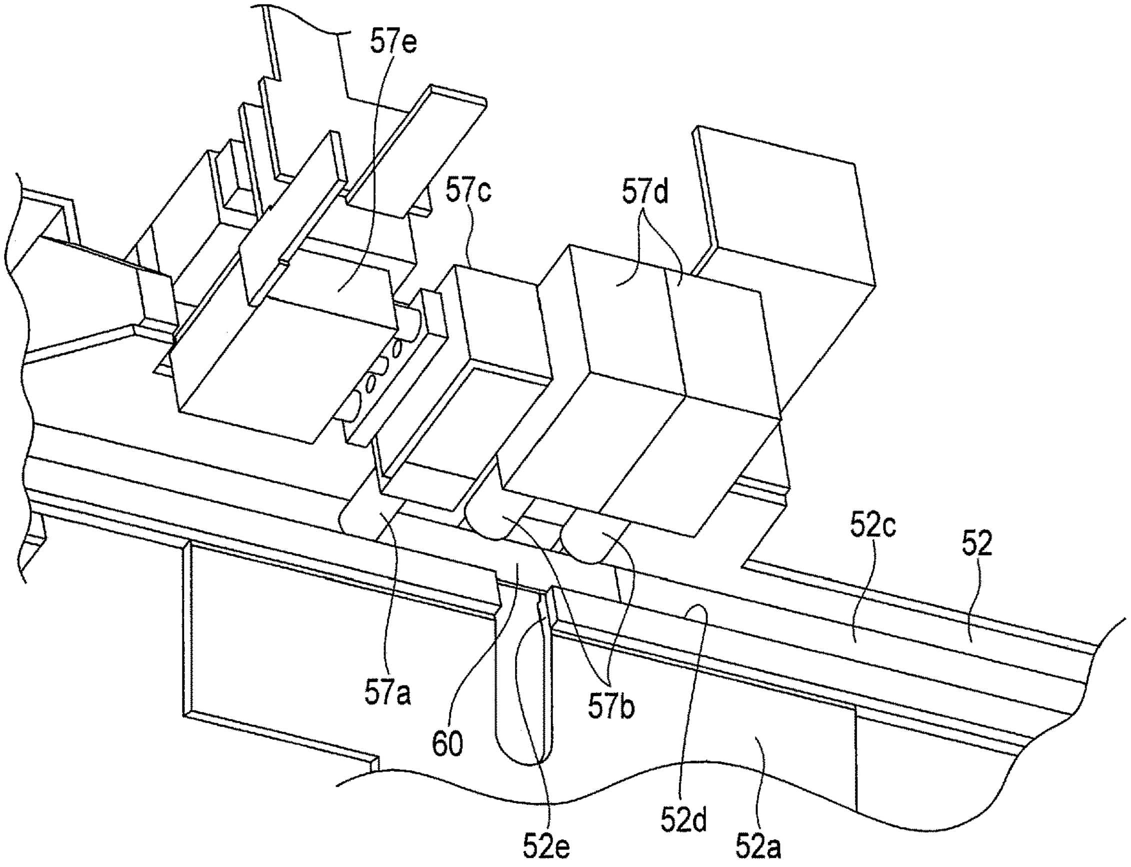
FIG. 7 is a perspective view showing a configuration of a peeling portion of the label peeling device.
Figure 8:
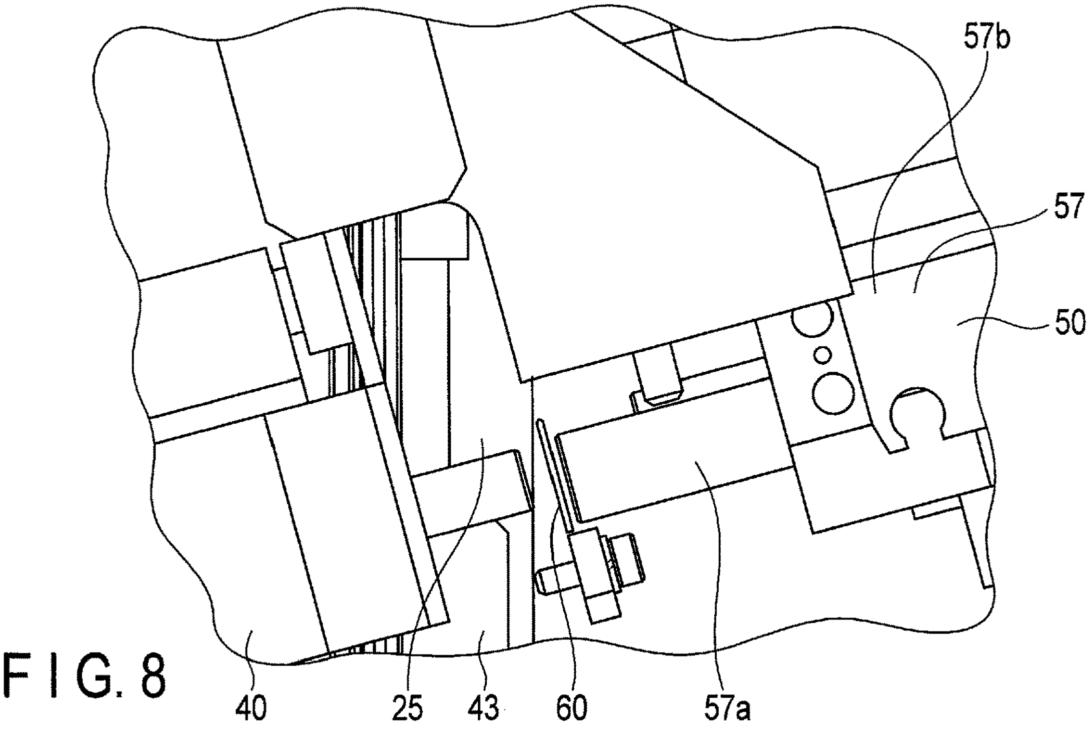
FIG. 8 is a side view showing a configuration of a part of the peeling portion of the label peeling device.
Figure 9:
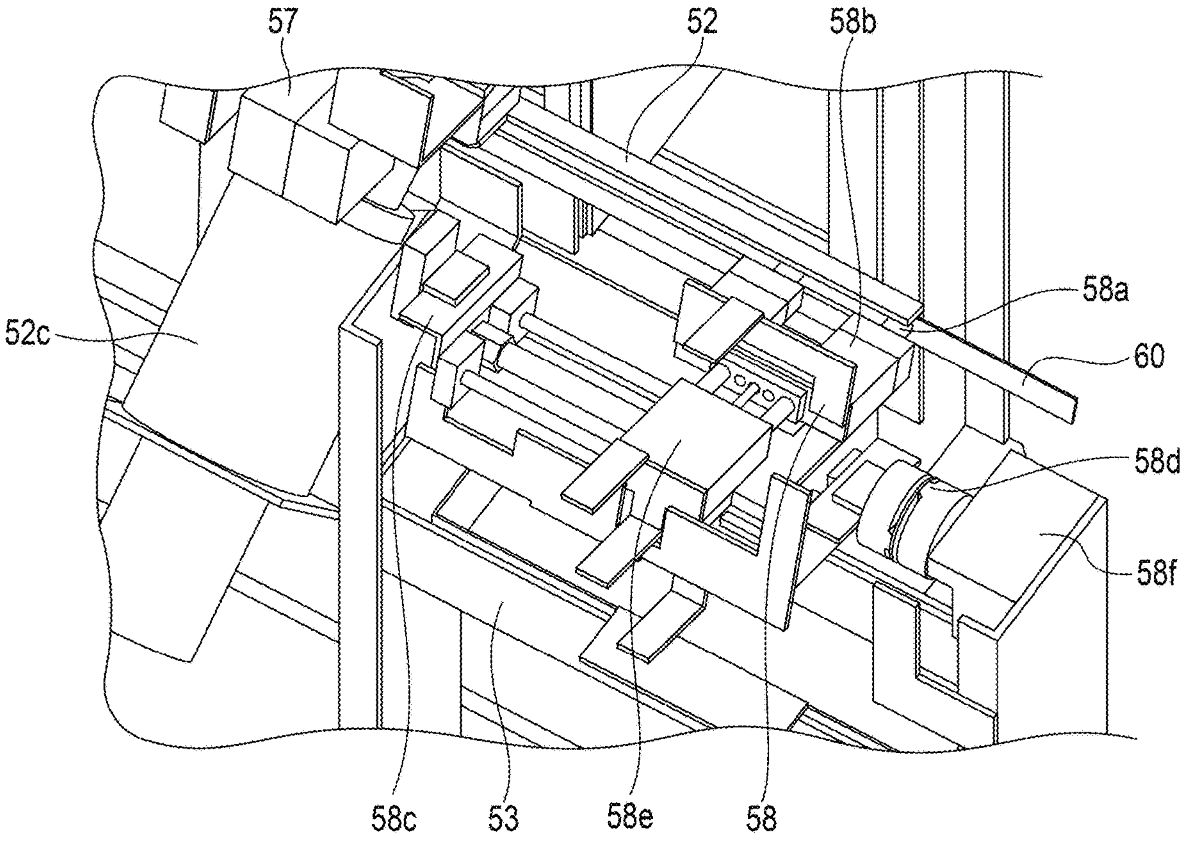
FIG. 9 is a perspective view showing configurations of the peeling portion and a cutter recovery portion of the label peeling device.

Embodiments of a label peeling device as a specimen processing apparatus and a label peeling method as a specimen processing method according to the present invention will be described with reference to the drawings. FIG. 1 and FIG. 2 is a front view and a side view showing a configuration of a specimen processing apparatus according to the first embodiment of the present invention. FIG. 3 is an explanatory view showing an appearance of a specimen container. FIG. 4 to FIG. 9 are explanatory views showing a specimen processing apparatus and a specimen processing method. FIG. 4 and FIG. 5 show a cutter supply portion. FIG. 6 to FIG. 8 show a peeling portion. FIG. 9 shows a cutter recovery portion. In the drawings, arrows X, Y, and Z respectively represent three directions perpendicular to one another: an X axis corresponds to a first direction, which is a conveyance direction through a conveyance pathway; a Y axis corresponds to a width direction of the conveyance pathway, and a Z axis corresponds to a vertical direction.

As shown in FIG. 1 and FIG. 2, a specimen processing apparatus 10 is a preprocessing apparatus which detects a condition of a specimen in advance before analyzing the specimen. The specimen processing apparatus 10 includes a conveyance device 20, a label peeling device 30, and a control device 70.

The conveyance device 20 conveys a specimen container 25 along a predetermined conveyance pathway 20*a* and is constituted of a conveyor-type holder conveyance mechanism, for example, provided below a peeling position. The conveyance device 20 specifically includes a pair of guide rails 21, a conveyor belt 22, and a belt feed mechanism. The paired guide rails 21 are disposed at a predetermined width along the conveyance pathway 20*a* extending in the X axis direction in FIG. 1.

The conveyor belt 22 is arranged between the guide rails 21 along the conveyance pathway 20*a*. The belt feed mechanism is a conveyor roller connected to a driving source such as a motor, and rotationally drives the conveyor belt 22 on the rear side thereof to feed the conveyor belt 22.

The conveyance device 20 conveys a holder 24 holding the specimen container 25 along the conveyance pathway 20*a* via feed motion of the conveyor belt 22. By means of various processing devices such as the label peeling device 30 disposed along the conveyance pathway 20*a*, the specimen container 25 or a specimen 25*a* is subjected to various processing.

The holder 24 holding the specimen container 25 is supported in an upright state between the pair of guide rails 21, and conveyed as the conveyor belt 22 moves. The specimen container 25 is, for example as shown in FIG. 3, a test tube formed of a transparent cylindrical body, an upper end thereof being open and a lower end thereof being closed to contain a specimen such as blood serum. For example, the specimen container 25 is made of transparent material, such as glass or resin. A label 27 is attached to an outer circumferential surface of the specimen container 25 by a bond or adhesive. The label 27 shows a bar code or character representing various kinds of indication information such as identification information of the specimen 25*a*. The indication information includes, for example, a name or a hospital ward representing the origin of the specimen, various numbers, etc.

The specimen 25*a* in the specimen container 25 is separated into a blood clot layer, a separating medium (silicone)

layer, and a blood serum layer, the three layers being arranged sequentially from the lower side in the order named. A first interface is formed between the blood clot layer and the separating medium layer. A second interface is formed between the separating medium layer and the blood serum layer. A specimen liquid surface is formed on the blood serum layer.

The label peeling device 30 is configured to peel at least a part of the label 27 attached to the outer circumferential surface of the specimen container 25. The label peeling device 30 includes a container moving device 40 as a container holding portion, and a cutter moving device 50. In this description, peeling a label includes shaving off a label.

The container moving device 40 shown in FIGS. 1, 2, 6, and 8 is disposed on, for example, one side of the conveyance pathway 20*a*. The container moving device 40 includes, for example, a chuck portion 42 as a chuck device including a pair of openable and closable arms 41, a press portion 44 including a pair of openable and closable press plates 43, and a container drive portion 45 including a drive mechanism configured to drive the chuck portion 42 and the press portion 44. For example, the container drive portion 45 includes a drive cylinder configured to open and close a pair of press plates 43 of the press portion 44 or the pair of arms 41 of the chuck portion 42 by reciprocal motion in the X-axis direction, a drive cylinder configured to reciprocate the chuck portion 42 in the Y-axis direction, and a drive cylinder configured to reciprocate the chuck portion 42 in the Z-axis direction. The container moving device 40 opens and closes the pair of arms 41 of the chuck portion 42 under the control of a controller 71, and holds a head portion of the specimen container 25 held by the holder 24 at a pickup position P01. Furthermore, under the control of the controller 71, the container moving device 40 moves up the chuck portion 42 holding the specimen container, moves it forward in the Y-axis direction, locates it at a peeling position P02, and holds the side of the specimen container 25 at three positions by the press portion. After a peeling process, the container moving device 40 moves the chuck portion 42 backward in the Y-axis direction, and then down to return the specimen container 25 to the pickup position P01 of the conveyance pathway 20*a*, and opens the chuck portion 42.

The cutter moving device 50 is disposed on, for example, the other side of the conveyance pathway 20*a*. The cutter moving device 50 includes a supply box 51, a cutter holder 52 including a cutter rail 52*a* that movably supports the cutter, a recovery box 53, a transfer mechanism 54 configured to hold the cutter 60 in the supply box 51 and transfer the cutter 60 to a supply position P11 of the cutter rail 52*a*, a sending portion 55 configured to send a cutter from the supply position P11 to a standby position P12 on a secondary side, a moving portion 56 configured to move the cutter holder 52 up and down to reciprocate between an up position P13 and the standby position P12, a sending portion 57 configured to send the cutter to a downstream side and move it from the standby position P12 to a recovery position P14, and a transfer mechanism 58 configured to a transfer the cutter from the recovery position P14 to the recovery box 53. In the cutter moving device 50, a supply portion for supplying a new cutter 60 is constituted by the supply box 51, the transfer mechanism 54, and the sending portion 55. Furthermore, in the cutter moving device 50, a recovery portion for recovering a used cutter 60 is constituted by the recovery box 53, the sending portion 57, and the transfer mechanism 58. Thus, the cutter moving device 50 includes the supply portion for supplying a new cutter 60 and the recovery portion for recovering a used cutter, and serves as a cutter exchange device to automatically exchange cutters 60.

As shown in FIGS. 1 to 4, the supply box 51 includes a storage portion 51*a* having a box shape with an opening, for example at an upper side, a bottom plate 51*b* of the storage portion 51*a*, and a drive mechanism 51*c* configured to move the bottom plate 51*b* up and down. The supply box 51 is configured to store a plurality of, for example, 50 cutters. The cutter 60 is shaped as, for example, a thin, rectangular plate that is long in one direction. A plurality of, for example, about 50 cutters 60 can be set in a stacked state in the supply box 51. An openable and closable lid 51*d* is provided on one side wall of the storage portion 51*a* of the supply box 51, so that a user can insert the cutters 60 sideways. The bottom plate 51*b* is moved by the drive mechanism 51*c*, such as a DC motor. By moving the bottom plate 51*b* up at a predetermined timing, the cutter 60 is sent to the opening at the upper side. The opening at the upper side is provided with a sensor. When the sensor detects that there is no cutter in the supply box 51 and the bottom plate 51*b* has moved to the uppermost portion, the controller 71 causes the bottom plate 51*b* to move down and stop.

For example, a replacement blade for a commercially available cutter knife may be used as the cutter 60. The cutter 60 is a plate-like member, for example made of steel, and having a predetermined width and length, with a sharp cut edge formed over the entire length of one side edge portion, namely, the upper edge portion, at a leading end of the direction of movement in a peeling process.

The cutter 60 is placed to face a circumferential surface of the specimen container 25 in the peeling process, and held in a position in which the longitudinal direction of the cutter extends along the conveyance pathway. In the peeling process, the cutter 60 is set in a position inclined at a predetermined angle, so that the upper edge portion is brought into contact with, and pressed against, the surface of the specimen container and the other side edge portion, namely, the lower edge portion, is spaced apart from the surface. For example, the cutter 60 is set at an angle of 5 degrees or more and 30 degrees or less, preferably 10 degrees or more and 20 degrees or less, more preferably about 15 degrees, with respect to an axial direction of the specimen container. When the edge portion of the cutter 60 is brought into contact with the label 27 on the specimen container 25 and moves up and down, a part of the label 27 is shaved off to form a window portion 27*b* having a predetermined width.

As shown in FIGS. 1 to 8, the cutter holder 52 extends in the X-axis direction, and includes the cutter rail 52*a* including a groove portion 52*d* having openings at both ends in the X-axis direction and at a front side, a rail drive portion 52*b* configured to move the cutter rail 52*a*, and a suction portion 52*c* configured to suck shavings of the label. The cutter rail 52*a* is a frame member disposed between an up-and-down path for the cutter and a container passage, and slidably supports the cutter 60. The cutter rail 52*a* extends in the X-axis direction and includes the grove portion 52*d* to hold the cutter. The groove portion 52*d* maintains the cutter in a position in which the cutter is inclined at an angle of 10 degrees to 30 degrees with respect to the axial direction of the specimen container.

The cutter rail 52*a* includes a slit 52*e* that is cut and opened at a predetermined process position. The cutter 60 is exposed through the slit 52*e* toward the specimen container 25. The cutter rail 52*a* is configured to moveably hold the cutter 60, which is a commercially available cutter knife, in the groove portion 52*d*. The cutter rail 52*a* supports the cutter 60 at both sides of the slit 52*e*, while a part of the cutter 60 is exposed through the slit 52*e* toward the specimen container 25. Thus, both sides of the cutter 60 are held by the cutter rail 52*a*.

The groove portion 52*d* of the cutter rail 52*a* includes a central process area A1 in which the slit 52*e* is formed, a supply area A2 provided above the supply box 51 and formed to be continuous to one end of the process area A1, and a recovery area A3 provided above the recovery box 53 and formed to be continuous to the other end of the process area A1. The process areas A1, A2, and A3 are connected in the first direction to form a cutter path. The cutter path has a length about three times that of the cutter 60. The rail drive portion 52*b* includes an up-and-down cylinder as an up-and-down drive portion configured to move the cutter rail 52*a* up and down, and performs a peeling operation to peel the label by moving the cutter rail 52*a* up and down while the cutter 60 is being held. The process area A1 is located to face the moving path of the specimen container 25. In the conveyance direction, the supply area A2 is located on the primary side of the process area A1, and the recovery area A3 is located on the secondary side of the process area A1.

In other words, the cutter holder 52 detachably holds the cutter 60, and moves relative to the specimen container 25 at a position where the blade, namely the upper edge of the cutter 60, is brought into contact with a side surface of the held specimen container, thereby performing a peeling process of peeling the label attached to the side surface of the specimen container 25.

The suction portion 52*c* is provided on the cutter holder 52 and moves along with the cutter holder 52. The suction portion 52*c* includes a suction nozzle that has a suction port facing a portion near the lower end of the slit 52*e* and that sucks peeled pieces, such as shavings of the peeled label. The suction portion 52*c* sucks shavings of the peeled label in the cutter holder 52 and collects them in a dust box connected to the secondary side of the suction portion 52*c* through a duct.

The transfer mechanism 54 on the supply side includes a holding head 54*b* including a plurality of suction magnets 54*a*, a base 54*c* configured to support the holding head 54*b* to be rotatable around the X axis, and a transfer drive portion 54*d* configured to rotate the base 54*c* and to move it in the X-axis direction. The transfer drive portion 54*d* includes, for example, a cylinder 54*e* configured to move the holding head 54*b* up and down, and a rotary motor 54*f* configured to rotate the base 54*c*.

The transfer mechanism 54 on the supply side moves down while the holding head 54*b* is facing downward, sucks and holds the cutter 60 located on top of the supply box 51, moves up and rotates the holding head 54*b*, causing the holding head 54*b* to face the cutter path of the cutter rail 52*a*, and further moves the holding head 54*b* in the Y-axis direction to set the cutter 60 to the supply area A2 of the cutter rail 52*a*.

The sending portion 55 on the supply side includes an engaging portion 55*a* configured to engage the cutter 60 in the supply area A2, and a send drive portion 55*b* configured to move the engaging portion 55*a* along the X axis. The send drive portion 55*b* includes, for example, a rodless cylinder, and reciprocates in the X-axis direction, thereby sliding the engaging portion 55*a* to send the cutter 60 from the supply area A2 to the process area A1.

As shown in FIGS. 7 to 9, the sending portion 57 on the recovery side includes a holding head 57*b* including a plurality of suction magnets 57*a*, and a sending drive portion 57*c* configured to move the holding head 57*b* in the X-axis direction. The sending drive portion 57*c* includes, for example, a holding cylinder 57*d* configured to suck and hold the cutter and release the cutter by reciprocating the holding head 57*b* in the Y-axis direction, and a sending cylinder 57*e* configured to reciprocate the holding head 57*b* in the X-axis direction. The sending portion 57 repeats a series of operations of moving the holding head 57*b* forward in a direction of approaching the cutter 60 in the Y-axis direction and holding the cutter 60, moving the holding head 57*b* to a downstream side in the X-axis direction, moving the holding head 57*b* back in a direction away from the cutter 60 to a retreat position, and returning it to an upstream side. In this way, the sending portion sequentially sends the cutter 60 to the downstream side and moves it from the standby position P12 to the recovery position P14. For example, the cutter 60 is moved toward the recovery side by a predetermined distance each time the peeling process is performed a predetermined number of times, thereby sequentially shifting a portion of the blade located in the slit 52*e* that performs the peeling process. For example, each time the peeling process is performed 200 times, the blade is shifted by 5 mm. For example, if the length of the blade is 100 mm, when the sending process is performed 20 times, the cutter 60 is sent from the process area A1 to the recovery area A3 and placed at the recovery position P14.

The transfer mechanism 58 on the recovery side includes a holding head 58*b* including a plurality of suction magnets 58*a*, a base 58*c* configured to support the holding head 58*b*, and a transfer drive portion 58*d* configured to move the base 58*c* in the X-axis direction and rotate it. The transfer drive portion 58*d* includes, for example, a cylinder 58*e* configured to move the holding head 58*b* up and down, and a rotary motor 58*f* configured to rotate the base 58*c*. The transfer drive portion 58*d* transfers the cutter 60 from the recovery position P14 to the recovery box 53.

The recovery box 53 includes a storage portion having a box shape with an opening at, for example, an upper side.

The control device 70 includes the controller 71, a storage 72, and a user interface 73. The controller 71 is, for example, a computer. The controller 71 includes a processor or an integrated circuit (control circuit) including a central processing unit (CPU), an application specific integrated circuit (ASIC), or a field programmable gate array (FPGA), etc. and a storage medium such as a memory. The controller 71 may include only one integrated circuit or the like, or a plurality of integrated circuits or the like. The controller 71 performs processing by executing a program or the like stored in the storage medium or the like. The controller 71 controls operations of various drive mechanisms. For example, the controller 71 activates a container moving mechanism and a cutter moving mechanism at a predetermined timing, to relatively move the cutter and the container, so that the peeling process to peel the label can be performed at a position where the cutter and the container are in contact with each other. Furthermore, the controller 71 causes the cutter moving mechanism to send the cutters sequentially to the secondary side through the predetermined moving path, thereby performing a supply process for sequentially supplying the cutters from the supply box to the process position, a cutter sending process for shifting the position where the cutter contacts the specimen container at the process position, and a recovery process for recovering the cutters in the recovery box.

The storage portion 72 includes a hard disk or a NAND flash memory as a storage medium.

The interface 73 has a function of receiving data output from the various sensors etc. and temporarily storing the received data. The interface 73 also has a function of sending a control signal and a function of sending an ON/OFF control signal to the drive mechanism. In addition, the interface portion 73 has a function of transmitting various data to the analysis device, or an external device, for example, an information terminal such as a personal computer, or a printer.

In the specimen processing apparatus according to the embodiment, the cutter can be attached to and detached from the apparatus. In addition, the shape of the cutter is not strictly limited; indeed, a wide variety of cutters are applicable to the apparatus. For example, a commercially available cutter knife can be used in the specimen processing apparatus according to the embodiment, reducing, therefore, the cost as compared to when an ultrasonic cutter is used. Furthermore, the cutter can be sequentially sent through a cutter moving path formed by the cutter rail. Therefore, shifting the position of the cutter allows for the sharpness of the cutter and consequently peeling performance to be maintained. Moreover, the cutters can be automatically exchanged so that high-performance and hygienic processing can be performed, and processing efficiency can be increased through reduction of human labor.

Furthermore, both sides of the cutter are supported by the cutter holder having a slit. Therefore, the cutter can be maintained at a predetermined contact angle relative to the specimen container, thereby maintaining the pressing force and the positional relationship with high accuracy. For example, a thin long rectangular cutter is used and placed so that its longitudinal direction is along the first (conveyance) direction perpendicular to the axial direction of the specimen container. The cutter is moved along the axial direction of the specimen container in a state in which the side of the cutter in the width direction is inclined at a predetermined angle relative to the axial direction of the specimen container. Thus, since the cutter can be maintained in a stable position and orientation, the operation of the cutter and the pressing force against the specimen container can be easily controlled. Specifically, as compared to a configuration in which, for example, the cutter is moved while the distal end of the blade is pressed against the specimen container and the proximal end thereof is supported, the change of the position of the distal end or the insufficiency of the pressing force due to a flexure of the blade or the like can be suppressed, and the appropriate position and pressing force can be ensured. Thus, since the depth of a cut can be maintained appropriately in the peeling process, for example, an excessively deep cut can be prevented. Therefore, the peeling process can be performed reliably at high speed, while damage to the specimen container can be prevented when the label is peeled.

The present invention is not limited to the embodiment described above. For example, the specific configuration for moving the cutter, the test processing sequences, and the details of the test processing can be variously modified without departing from the spirit of the present invention. For example, the label peeling device 30 may include an image capturing device provided on the upstream side or the downstream side of a peeling processing portion, so that an image of the specimen container may be acquired.

The peeled part of the label 27 is not limited to the entire length of a portion of the label in the axial direction. For example, only a part of the length in the axial direction may be removed, or the entire label 27 may be peeled.

Figure 10:
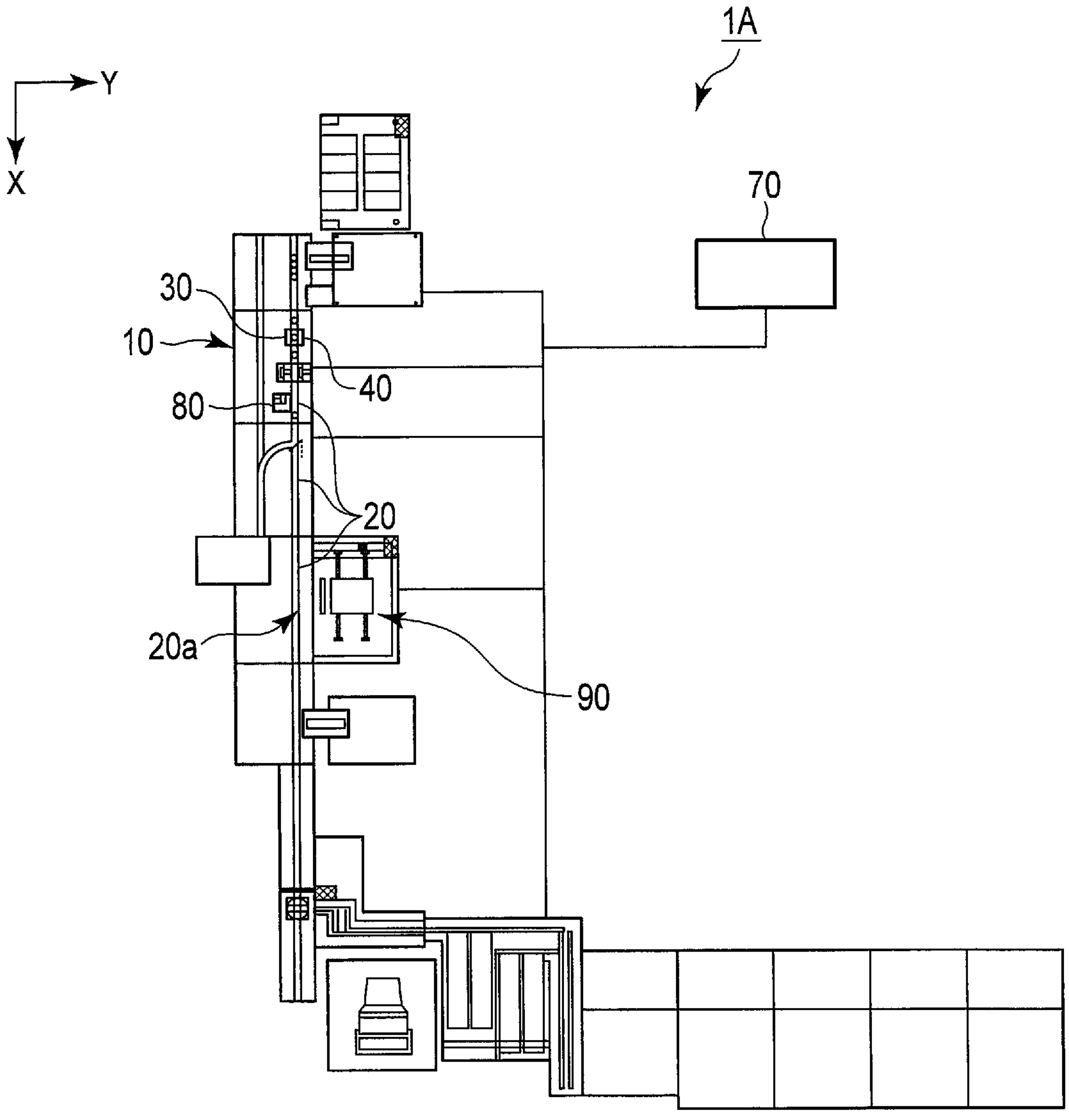
FIG. 10 is a plan view showing a configuration of a specimen processing unit according to another embodiment.

Furthermore, the specimen processing apparatus may include a processing device for performing another process along the conveyance pathway 20*a* of the conveyance device 20 on the upstream side or the downstream side of the label peeling device 30. For example, as another embodiment, other processing devices may be disposed beside the label peeling device 30, as shown in FIG. 10. For example, the specimen processing apparatus 10 shown in FIG. 10 includes an image capture device 80 and an analysis device 90 in the downstream side of the label peeling device 30. Processes can be sequentially performed while the specimen container 25 is conveyed through the conveyance pathway 20*a*, for example, by disposing the processing devices near or continuously to the conveyance device 20 or the conveyance pathway 20*a*. Furthermore, in addition to the image capture device, the processing apparatus may include various process devices, such as a process device configured to perform a sorting process or an analysis process based on information acquired from captured images, a read device configured to read a bar-code, a batch dispensing device, a stopper opening device, a stopper closing device, an analysis device, etc. Even in this case, the various process devices may be disposed along the conveyance pathway in combination with the label peeling device, so that a series of processes can be performed sequentially during the conveyance process.

In the embodiment described above, specimen processing is performed for each specimen container 25. However, the processing may be performed simultaneously for a plurality of specimen containers 25.

The present invention is not limited to the above-described embodiments, and can be modified in various manners in practice when implementing the invention without departing from the gist of the invention. Moreover, the embodiments can be suitably combined; in that case, the combined advantages are obtained. Furthermore, the above-described embodiments includes various inventions, and a variety of inventions can be derived by suitably combining structural elements disclosed in connection with the embodiments. For example, if the object of the invention is achieved and the advantages of the invention are attained even after some of the structural elements disclosed in connection with the embodiments are deleted, the structure made up of the resultant structural elements can be extracted as an invention.

The invention claimed is:

1. A label peeling device comprising:

a container holding portion configured to hold a specimen container;

a cutter holder configured to detachably hold a cutter, to apply a blade of the cutter to a side surface of the specimen container held by the container holding portion with a label being attached to the side surface, and to move along an axial direction of the specimen container, thereby peeling the label attached to the side surface of the specimen container; wherein the cutter is a cutter knife blade extending in a first direction and having a blade portion on one side edge;

the cutter holder comprising:

a cutter rail extending in the first direction and configured to hold the cutter so as to be movable in the first direction; and a rail drive portion configured to move the cutter rail in a direction different from the first direction, wherein the cutter holder is configured to move the cutter along the axial direction of the specimen container while the cutter is being pressed against a surface of the specimen container;

wherein the cutter rail forms, in the first direction, a cutter moving path including a process area to which the specimen container is opposed, a supply area located on a primary side of the process area, and a recovery area located on a secondary side of the process area;

a cutter sending portion configured to move the cutter in the first direction through the cutter rail; and a cutter exchange device comprising a supply portion configured to set the cutter in the supply area and a recovery portion configured to recover the cutter placed in the recovery area.

2. The label peeling device according to claim 1, further comprising a conveyance device configured to convey the specimen container along a conveyance pathway extending in the first direction, wherein:

the container holding portion includes a chuck device configured to hold and move the specimen container on the conveyance pathway; and the cutter rail is disposed on a side of the specimen container that faces the cutter, has an opening in the process area, and is configured to hold the cutter so as to keep it inclined with respect to the axial direction of the specimen container at an angle of 10 degrees to 30 degrees.

3. The label peeling device according to claim 2, wherein the conveyance device comprises a conveyor-type holder conveyance mechanism.

4. The label peeling device according to claim 1, wherein the cutter holder includes a suction nozzle configured to suck peeled pieces of the peeled label.

5. The label peeling device according to claim 1, wherein:

the container holding portion comprises a chuck device configured to hold the specimen container;

the rail drive portion comprises an up-and-down cylinder configured to move the cutter rail up and down;

the cutter sending portion comprises an engaging portion configured to engage with the cutter and a drive portion configure to move the engaging portion;

the supply portion comprises a supply box configured to store a new cutter;

the recovery portion comprises a recovery box configured to store a used cutter; and the cutter exchange device comprises a transfer mechanism configured to transfer the used cutter to the recovery box.

6. The label peeling device according to claim 1, wherein the cutter rail comprises a groove portion having openings at both ends in a longitudinal direction and at a front side.

7. A label peeling method, comprising:

supplying a cutter to a process position wherein the cutter is a cutter knife blade extending in a first direction and having a blade portion on one side edge;

extending in the first direction and configured to hold the cutter, a cutter holder comprising a cutter rail movable in the first direction, and a rail drive portion configured to move the cutter rail in a direction different from the first direction, the cutter holder configured to move the cutter along an axial direction of a specimen container while the cutter is being pressed against a surface of the specimen container;

forming, in the first direction, a cutter moving path including a process area to which the specimen container is opposed, a supply area located on a primary side of the process area, and a recovery area located on a secondary side of the process area;

moving the cutter in the first direction through the cutter rail with a cutter sending portion;

conveying the specimen container along a conveyance pathway extending in the first direction, wherein the container holding portion includes a chuck device configured to hold and move the specimen container on the conveyance pathway, and wherein the cutter rail is disposed on a side of the specimen container that faces the cutter includes an opening in the process area and configured to hold the cutter keeping it inclined with respect to the axial direction of the specimen container at an angle of 10 degrees to 30 degrees;

in a state in which the cutter is in contact with the specimen container, peeling a label on the specimen container by relatively moving the specimen container and the cutter;

after peeling the label, moving the cutter from the process position to a recovery position to recover the cutter;

setting the cutter in the supply area by way of a cutter exchange device; and recovering the cutter placed in the recovery area by way of a recovery portion.

* * * * *